US009246340B2

United States Patent
Shilimkar et al.

(10) Patent No.: US 9,246,340 B2
(45) Date of Patent: Jan. 26, 2016

(54) BATTERY PACK

(75) Inventors: Vikas S. Shilimkar, Hillsboro, OR (US);
Donald J. Nguyen, Portland, OR (US);
Nagasubramanian Gurumoorthy,
Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 524 days.

(21) Appl. No.: 13/025,964

(22) Filed: Feb. 11, 2011

(65) Prior Publication Data
US 2012/0206101 A1    Aug. 16, 2012

(51) Int. Cl.
*H02J 7/00* (2006.01)
*G06F 1/26* (2006.01)
*G06F 1/32* (2006.01)

(52) U.S. Cl.
CPC ............ *H02J 7/0011* (2013.01); *G06F 1/263* (2013.01); *G06F 1/32* (2013.01); *H02J 7/0027* (2013.01)

(58) Field of Classification Search
CPC ..... H02J 7/0003; H02J 7/0024; H02J 7/0011; H02J 7/0027; G06F 1/263; G06F 1/32
USPC .......................... 320/112, 136, 126, 116, 121
See application file for complete search history.

(56) References Cited

U.S. PATENT DOCUMENTS

| 4,413,220 | A | | 11/1983 | Waineo |
| 5,814,972 | A | * | 9/1998 | Shimada et al. ............... 320/132 |
| 6,650,089 | B1 | * | 11/2003 | Freeman et al. ............... 320/132 |
| 8,381,852 | B2 | * | 2/2013 | Zolman et al. ........... 180/65.285 |
| 2008/0048608 | A1 | * | 2/2008 | Lim et al. ....................... 320/106 |
| 2008/0306637 | A1 | * | 12/2008 | Borumand et al. ................ 701/3 |
| 2009/0079265 | A1 | * | 3/2009 | Seligman ......................... 307/48 |
| 2010/0201318 | A1 | * | 8/2010 | Sugiyama et al. ............. 320/120 |
| 2011/0279085 | A1 | * | 11/2011 | Shigemizu et al. ............ 320/117 |
| 2012/0173031 | A1 | * | 7/2012 | Parameswaran et al. ..... 700/295 |

FOREIGN PATENT DOCUMENTS

| JP | 08172733 | 7/1996 |
| JP | 2009131143 | 6/2009 |
| TW | 200938288 | 9/2009 |
| WO | WO2009131918 | * 10/2009 |

OTHER PUBLICATIONS

International Search Report and Written Opinion received for PCT Patent Application No. PCT/US2011/066436, mailed Jul. 9, 2012, 10 pgs.
Office Action received for Taiwanese Patent Application No. 100147956, received Mar. 10, 2014, 4 pages English translation.

* cited by examiner

*Primary Examiner* — Richard Isla Rodas
*Assistant Examiner* — Nathaniel Pelton
(74) *Attorney, Agent, or Firm* — Kacvinsky Daisak Bluni PLLC

(57) ABSTRACT

An apparatus may comprise a battery system. Other embodiments are described and claimed.

15 Claims, 4 Drawing Sheets

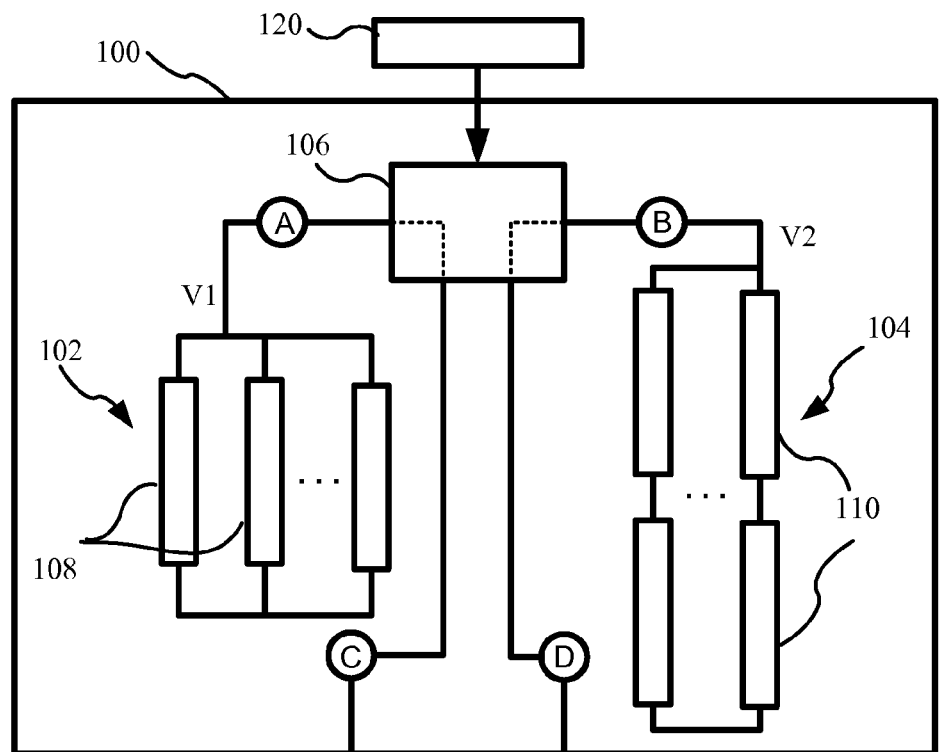
*FIG. 1*
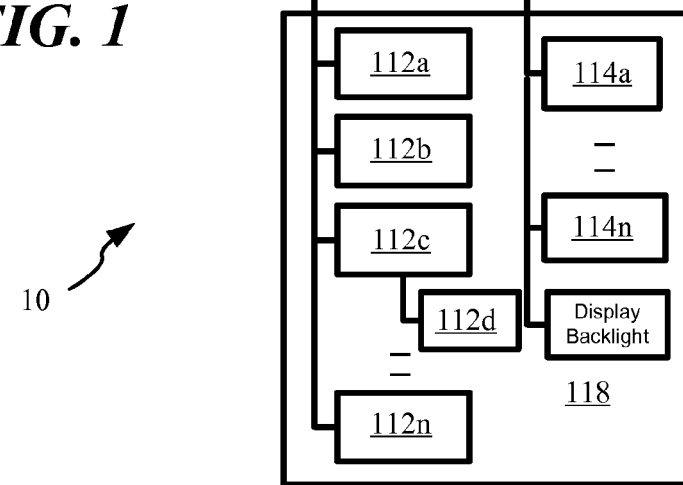

BATTERY PACK

BACKGROUND

Battery life is a key feature of portable electronic devices, such as Tablet PCs. Presently, voltage regulator (VR) losses are key contributors to total platform power loss, typically contributing in the range of 13-23% to power loss. Tablet platforms may employ a single battery pack to supply power to all the voltage regulators and display subsystems in the platform. For example, a 12.6V battery pack having a format of 3 series×parallel cells, (3S×P) may be used to power a VR that generates 5V as well as a VR that generates 0.75V in the platform (device).

Additionally, the VR power-conversion efficiency is very sensitive to the difference between input and output voltages. The power dissipated P in devices switched with a frequency f, can be expressed as $CV^2f$, where C is the capacitance and V the voltage. Generally, larger differences between input and output voltage in a VR result in more power losses, meaning lower efficiency. Thus, using a single battery pack with high number of series connection, may result in an inefficient system because of significant VR power losses.

In addition, battery powered platforms can experience conduction losses from sense resistors in battery packs and charging circuitry. Typically, battery packs and charging circuitry have duplicate sense resistors, which may afford better protection, but may add to expense (cost and power). It is with respect to these and other considerations that the present improvements have been needed.

BRIEF DESCRIPTION OF THE DRAWINGS

FIG. 1 illustrates one embodiment of a battery system.

DETAILED DESCRIPTION

Figure 2:
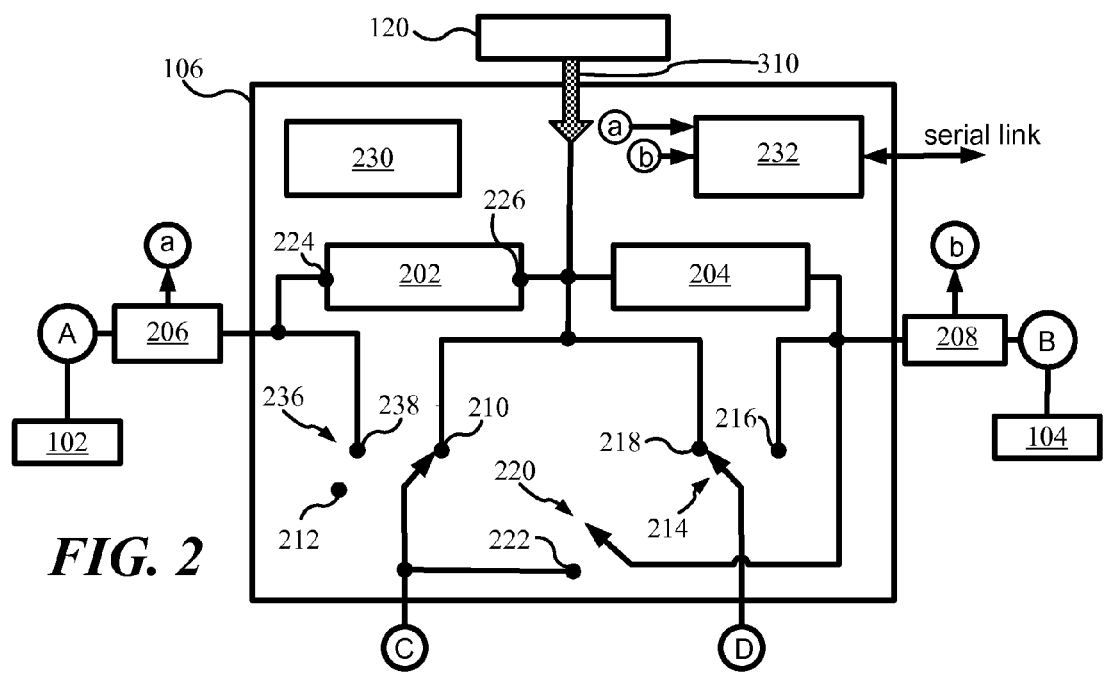
FIG. 2 illustrates one embodiment of a battery charger.

Various embodiments may be generally directed to battery packs for devices including mobile computing or mobile communication devices, or devices that are arranged to perform both computing and communications.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

FIG. 1 depicts one embodiment of a battery system 100 that has a multiple battery pack architecture including a set of battery packs 102 and 104. Battery system 100 includes a battery charger 106 that is connected to both battery pack 102 and battery pack 104.

In various embodiments, battery system 100 may be operable in more than one mode. Battery charger 106 may be operable to receive current from a charging power source 120. In various embodiments, charging power source 120 may be a source of direct current power, such as a solar cell-based source, or a conventional battery. In some embodiments, charging power source 120 may be an alternating current (AC)/DC adapter, which may be a conventional adapter that is arranged to receive AC current from an AC power source and to output DC current. In the discussion to follow, embodiments of charging power source 120 may simply be referred to as an AC/DC adapter, although embodiments of battery system 100 that receive other types of charging are possible. When charging power is available, for example, when AC/DC adapter 120 is connected to an AC power source (not shown) and is connected to battery system 100, the DC power that is output from AC/DC adapter 120 may be sent to battery charger 106, which may distribute the power in various ways.

The DC power received from AC/DC adapter 120 may also be sent from battery charger 106 along points A and B to respective battery packs 102 and 104 in order to supply a charging current when one or more of the battery packs is not fully charged.

When charging power is not available, that is, when either battery system 100 is not connected to AC/DC adapter 120 or AC/DC adapter 120 is not connected to an AC power source, or both, battery system 100 may enter a discharge mode. In a discharge mode, one or more of battery packs 102 and 104 may discharge power to devices in a device platform connected to the battery system.

In various embodiments, battery charger 106 may supply power to respective devices 112 and 114 located in a device platform 118. In some embodiments, the power transmitted to device platform 118 may be received from battery packs 102 and/or 104. In other embodiments, the transmitted power may be received from AC/DC adapter 120 through points C and D. In various embodiments, device platform 118 may be a computing device platform. In some embodiments, device platform 118 may be a communications device platform. In various other embodiments device platform 118 may be any other portable electrical apparatus platform that includes multiple devices. In various embodiments battery system 100 and device platform 118 may form part of a portable system 10, such as a portable computer, portable communications device, and other portable devices. Thus, battery system 100 and platform 118 may be included in a common device housing (not shown).

Figure 6:
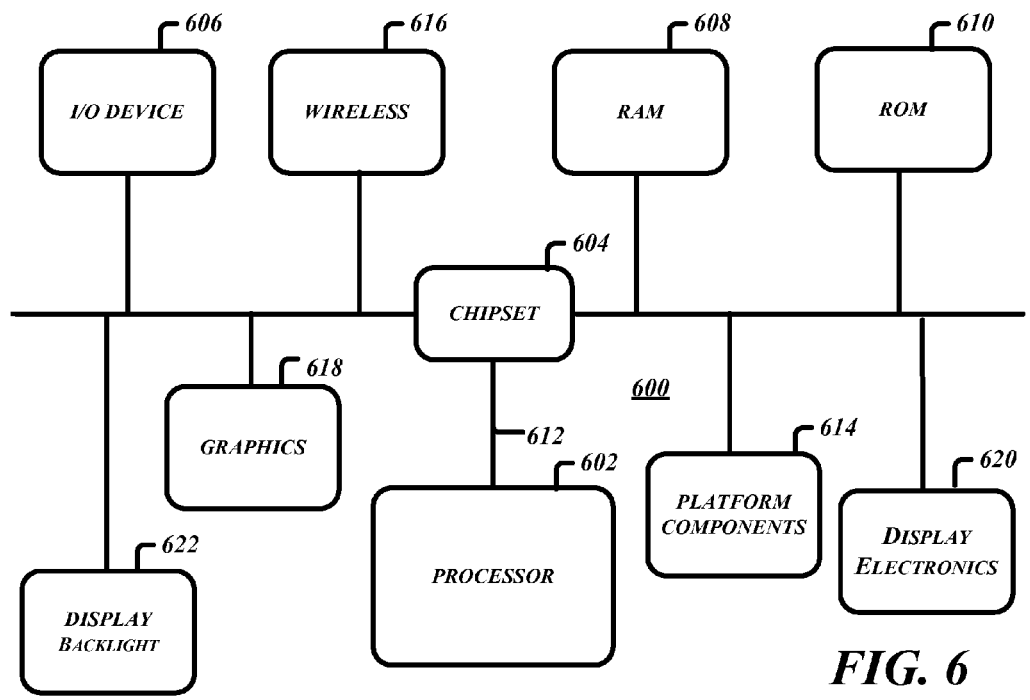
FIG. 6 illustrates one embodiment of a device platform.

FIG. 6 is a diagram of an exemplary system embodiment, which may be an embodiment of device platform 118. In particular, FIG. 6 is a diagram showing a platform 600, which may include various elements. For instance, FIG. 6 shows that platform (system) 600 may include a processor 602, a chipset 604, an input/output (I/O) device 606, a random access memory (RAM) (such as dynamic RAM (DRAM)) 608, and a read only memory (ROM) 610, display electronics 620, display backlight 622, and various other platform components 614 (e.g., a fan, a crossflow blower, a heat sink, DTM system, cooling system, housing, vents, and so forth). System 600 may also include wireless communications chip 616 and graphics device 618. The embodiments, however, are not limited to these elements.

As shown in FIG. 6, I/O device 606, RAM 608, and ROM 610 are coupled to processor 602 by way of chipset 604. Chipset 604 may be coupled to processor 602 by a bus 612. Accordingly, bus 612 may include multiple lines.

Processor 602 may be a central processing unit comprising one or more processor cores and may include any number of processors having any number of processor cores. The processor 602 may include any type of processing unit, such as, for example, CPU, multi-processing unit, a reduced instruction set computer (RISC), a processor that have a pipeline, a complex instruction set computer (CISC), digital signal processor (DSP), and so forth.

In various embodiments, the components of system 600 may be powered by battery system 100. In some embodiments, battery system 100 may be arranged to provide multiple modes for powering components of system 600. In some embodiments, battery system 100 may be arranged to connect battery pack 102 to a first set of components of system 600, and to connect battery pack 104 to a second, different set of components of system 600. In some embodiments of the battery system, devices 112 comprise a first set of voltage regulators and devices 114 comprise a second set of voltage regulators and display subsystem components. Accordingly, in the discussion to follow, elements 112 and 114 may be referred to as either devices or voltage regulators. As depicted in FIG. 1, devices 112 and 114 may be arranged to respective voltage from battery packs 102 and 104 through battery charger 106. In various embodiments, voltage regulators 112 may be used to regulate voltage for a first set of devices (not separately shown) that operate over a first range of voltages, while voltage regulators 114 may be used to regulate voltage for a second set of devices that operate over a second range of voltages that is higher than the first range of voltages. The terms "operate" or "operating," when used herein in conjunction with voltages of voltage regulators, generally refer to the output voltages that are sent to devices coupled to the voltage regulators.

In various embodiments, a first and second set of devices regulated by respective VRs 112 and 114 may include components 602-622. In some embodiments, the voltage regulators may be "on-chip," that is, the voltage regulators may be part of a device such as an integrated circuit chip having other components whose voltage is being regulated.

In some embodiments, battery pack 102 may provide a lower voltage than battery pack 104 and the voltage regulators 112 may operate over a lower voltage range than voltage regulators 114. In some embodiments voltage regulators 112 may operate over a lower voltage range that partially overlaps the voltage range used by regulators 114. Accordingly, the terms "lower voltage range," or "higher voltage range," as used herein, refer to ranges that may overlap, but where at least the middle of the respective range is lower or higher than its counterpart. By coupling lower-operating-voltage VRs to a lower voltage battery, and higher-operating-voltage VRs to a higher voltage battery, the battery system 100 may thus provide a more efficient use of battery power to operate devices of a device platform 118 by more closely matching the input voltage of a VR to its designed output voltage.

In one embodiment, for example, battery pack 102 may be configured to output a voltage V1 that is more closely matched to the range of operating voltages used by voltage regulators 112 than is a voltage V2 that is output by battery pack 104. Accordingly, the difference between input and output voltages in regulators 112 may be less when powered by battery pack 102 than if the regulators 112 were to be powered by battery pack 104. Battery pack 104, on the other hand, may output a voltage V2 that is suitable for supplying voltages to voltage regulators 114, which may operate over a higher voltage range. In this manner, although battery pack 104 may output a relatively higher voltage than battery pack 102, the (average) difference between input voltage and output voltage in regulators 114, and therefore the voltage regulator power loss, may be low.

In some embodiments, the output voltage of battery pack 102 may be about 1-6 V and in particular about 2.8-4.2 V. In some embodiments, the output voltage of battery pack 104 may be about 3-10 V, and in particular about 5.6 to 8.4 V. In various embodiments, the operating voltages of devices 112 may be about 2.8 V or less and the operating voltages of devices 114 may be about 2.8 V or higher, and in particular, about 3 V-8 V. In some embodiments, devices 112 may be VRs that regulate one or more of a core CPU processor, a graphics core device, a memory device, and I/O devices, among others, which may operate at voltages in the range of 0.5 V to about 2.8 V. In some embodiments, devices 114 may be VRs that regulate display devices, backlight drivers, and system (platform) devices, among others, which may operate at voltages in the range of about 2.8 V to about 8 V.

In various embodiments, battery packs 102 and 104 may each contain multiple batteries, as depicted in FIG. 1. The batteries may be conventional rechargeable batteries, such as lithium ion batteries. However some battery pack embodiments may have a single battery in each battery pack. In the embodiment of FIG. 1, battery pack 102 is arranged in a 1S×P configuration, meaning a total of x batteries arranged in parallel fashion. Battery pack 104 may be arranged in a 2S×P configuration as shown, meaning two batteries arranged in a series fashion and x such series batteries arranged in parallel between each battery. Various other embodiments may include other combinations of parallel and series arrangement of batteries for each of battery packs 102 and 104. In some embodiments, all the batteries in the battery packs are the same type of battery and output the same voltage. In some embodiments, the batteries 108 and 110 may be 3V or 4.2V lithium ion batteries.

FIGS. 2-5 depict details of battery charger embodiments, which may be embodiments of battery charger 106. The components may in general be the same among the various battery charger embodiments illustrated in FIGS. 2-5, however, the switch configuration and mode of operation may vary, as depicted and described further below.

In various embodiments, battery charger 106 may include a circuit arrangement that connects the AC/DC adapter 120 to both low voltage VRs and high voltage VRs in a device platform, such as platform 118. In some embodiments, such as that depicted in FIG. 2, battery charger 106 may be operable to connect power from the AC/DC adapter 120 to VRs 112 and 114 (represented by output points C and D, respectively), using a pair of switches 236 and 214, respectively. In the arrangement illustrated in FIG. 2, and referring also to FIG. 1, when a charging power source is available, input voltage 310 received from AC/DC adapter 120, the voltage may be distributed to points C and D, leading to the VRs 112, and 114, respectively. For example, switch 236 may be connected to terminal 210 and switch 214 may be connected to terminal 218. In this configuration, device platform components may be powered by a charging power source.

In some embodiments, battery charger 106 includes converters 202 and 204, which may be connected to AC/DC power adapter 120. In various embodiments, converters 202 and 204 may be arranged as buck (down) converters, boost (up) converters, or both buck and boost converters (buck-boost). In some embodiments, converter 202 may be arranged as a buck or buck-boost converter, while converter 204 may be arranged as a buck, boost or buck-boost convert.

In one embodiment, when charging power is available, voltage 310 may be received by converters 202, 204 and converted to an appropriate voltage and used to charge respective battery packs 102, 104 according to the charge state of each battery pack.

Battery charger 106 may further include coulomb counter current sense resistors to monitor battery charge current. In one embodiment, battery charger 106 includes coulomb counters 206 and 208 that may track charge states for respective battery packs 102 and 104. Thus, during a charging mode, for example, when power is received from AC/DC Adapter 120, the coulomb counters may detect when one or more of the battery packs is fully charged. In some embodiments, the same sense resistor can be used for both the purposes.

In some embodiments, when the battery packs 102, 104 are determined to be fully charged and charging power is available, the battery packs may be decoupled from the charging power.

As depicted in FIG. 2, battery charger 106 may have a plurality of switches that are each operable to establish a plurality of different connections within the battery charger. Switch 236 may have three different positions as shown. When the switch connects to terminal 210, current may flow from AC/DC Adapter to devices that may be connected to a battery charger output at point C, as discussed above. When the switch 236 connects to terminal 238, battery pack 102 may supply power to devices 112. When switch 236 is connected to terminal 212, both AC/DC power adapter 120 and battery pack 102 are isolated from external components connected to output C. Accordingly, switch 236 may be set to terminal 212 when external devices, such as low voltage VRs are to be idled or powered off, or when battery pack 102 is out of charge. In one embodiment, switch 236 may be connected to terminal 212 when battery pack 102 is out of charge and battery pack 104 supplies power to C through switch 220, as described further below.

Likewise, switch 214 may connect to a plurality of terminals to establish a different connection between devices and the source of power to those devices. When the switch 214 connects to terminal 218, current may flow from AC/DC Adapter 120 to external devices that may be connected to a battery charger output at point D, as discussed above. When the switch 214 connects to terminal 216, battery pack 104 may supply power to external devices.

In further embodiments, battery charger 106 may include a backup switch 220, which may toggle between an open position and a closed position at terminal 222. When in the closed position, switch 220 may connect battery pack 104 to external devices connected to output terminal at point C. Battery pack 104 may accordingly supply power to such devices when other sources of power are not available, as discussed further below. Switch 236 may be connected to terminal 212 during this condition.

In some embodiments, battery charger 106 may include a temperature sensor 230 and system bus controller 232. In some embodiments temperatures sensor feedback may be provided in individual battery packs 102, 104. In one embodiment, the charge status detected at coulomb counters 206, 208 may be sent to controller 232, which may be polled to provide this information, as well as temperature information, as depicted in FIG. 2.

Figure 3:
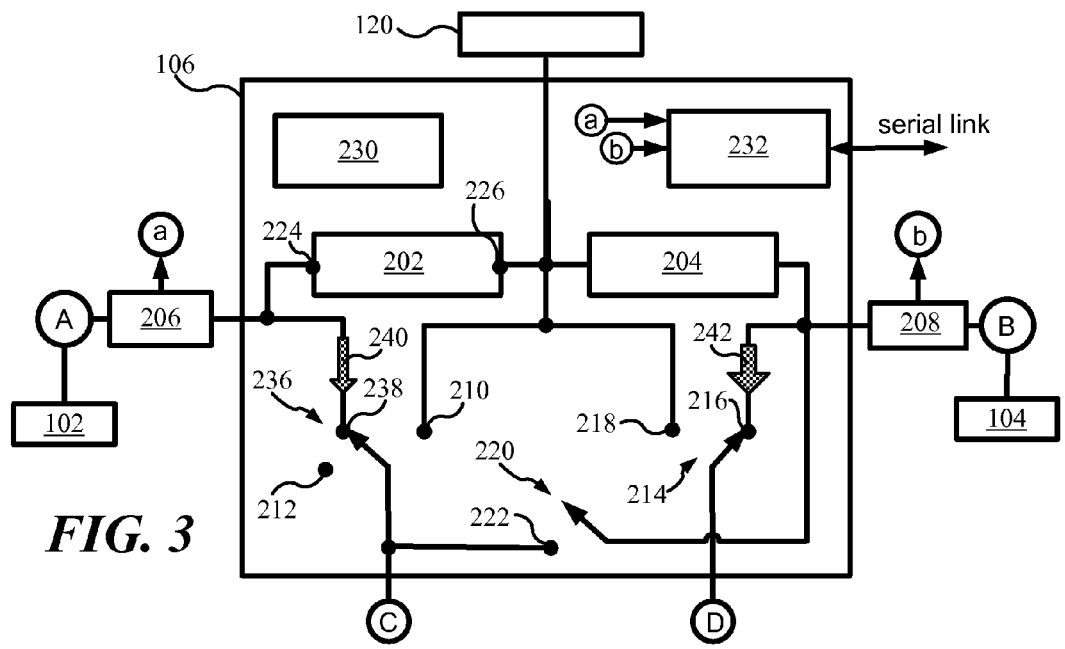
FIG. 3 illustrates one embodiment of a battery charger.

FIG. 3 depicts operation of battery charger 106 when no source of charging power is available and devices in a device platform are to be powered. In some embodiments, switch 236 may connect battery pack 102 to outside devices through terminal 238. Battery pack 102 may accordingly output a voltage 240 designed to power a first set of voltage regulators, as discussed above. In some embodiments, switch 214 may connect battery pack 104 to outside devices through terminal 216. Battery pack 104 may accordingly output a voltage 242 that is higher than voltage 240 and is designed to power a second set of voltage regulators, as also discussed above.

Figure 4:
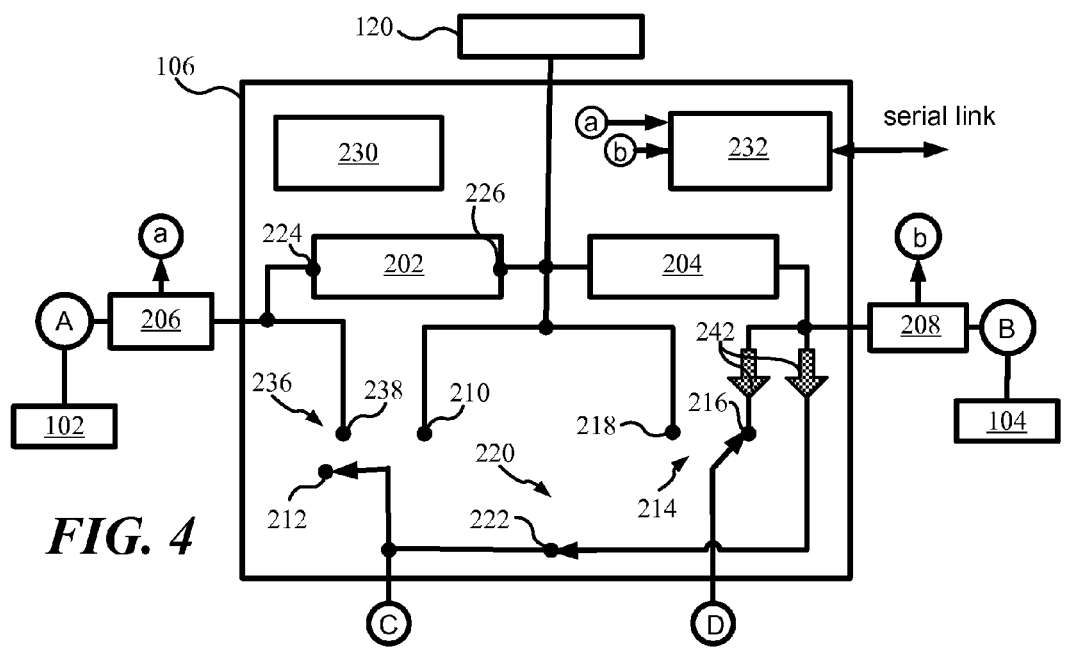
FIG. 4 illustrates one embodiment of a battery charger.

FIG. 4 depicts one arrangement of battery charger 106 when no source of charging power is available and all devices in a device platform are to be powered. However, under some conditions, it may be desirable or necessary to power devices that are normally connected to battery pack 102 using battery pack 104. For example, coulomb counter 206 may detect that battery pack 102 has run out of charge, while coulomb counter 208 indicates that battery pack 104 has sufficient charge to power external devices, such as those connected to battery charger 106 through point C. In some embodiments, as depicted in FIG. 4, battery pack 104 may therefore be used to power both higher voltage VRs connected through point D, as well as lower voltage VRs that are connected through point C. In the particular arrangement illustrated in FIG. 4, battery pack 104 outputs voltage 242 on separate lines. A first line is connected through switch 214 to devices, such as higher voltage VRs, which may be connected to point D. A second line is connected through closed switch 222 to devices such as lower voltage VRs, which may be connected to point C. Notably, switch 236 is connected to terminal 212 during this condition.

In some embodiments, battery system 100, or more particularly, battery charger 106, may be operable to automatically close switch 222 when there is little or no charge in battery pack 102. In some battery system embodiments, a charge threshold for battery pack 102 may be set below which the switch 222 is closed. In some embodiments, controller 232 may be polled to determine the charge state periodically in order to determine if and when to close switch 222.

Accordingly, battery system 100 may power all devices 112, 114 using battery pack 104 when the charge state in battery pack 102 is low or completely depleted and no charging power is available. When charging power subsequently becomes available, battery system 100, and in particular, battery charger 106 may reset its circuit arrangement. For example, in some embodiments, switch 222 may open automatically when a charge threshold for using battery pack 102 is met, which threshold may be different from the threshold for closing switch 222. This may help prevent the inefficient use of battery pack 104 to power both higher and lower voltage VRs when the device platform connected to battery system 100 subsequently becomes disconnected from charging power.

In some embodiments, as depicted in FIG. 4, switch 236 may be set to terminal 212 when no charging power is available and the charge state of battery pack 102 is below a threshold value.

In accordance with additional embodiments, battery system 100 may also operate to power higher voltage VRs using lower voltage battery pack 102. For example, battery pack 104 may become depleted of charge such that its charge state is below a threshold value, while battery pack 102 retains sufficient charge to power higher voltage components. This may occur when no source of charging power is available to system 100 and devices coupled to VRs 114 are excessively used. Although the output voltage of battery pack 102 may typically be insufficient to power higher voltage devices, such as VRs 114, embodiments of battery charger 106 provide the ability to use battery pack 102 to power such devices.

Figure 5:
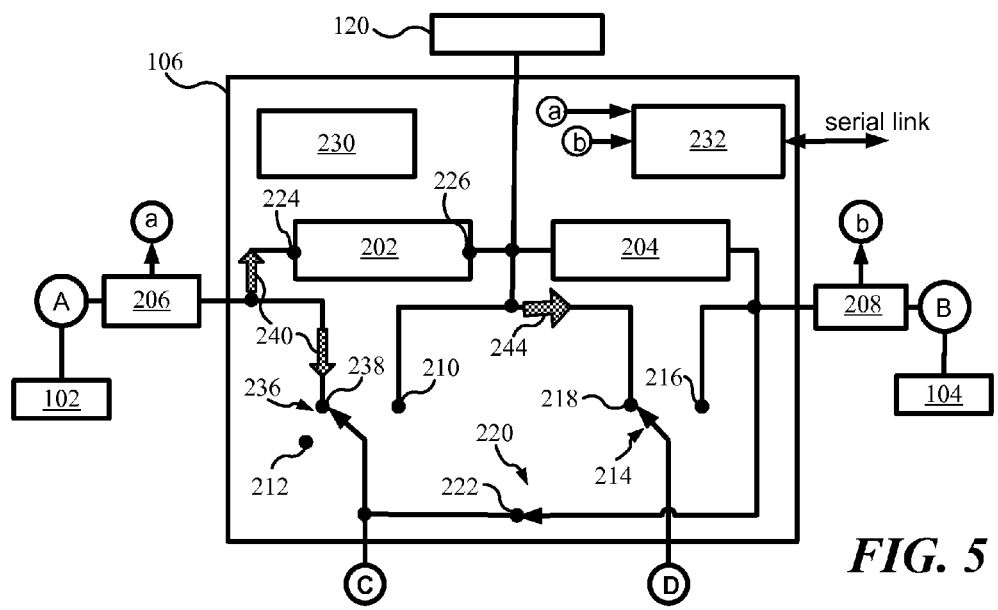
FIG. 5 illustrates one embodiment of a battery charger.

FIG. 5 depicts a battery charger embodiment in which battery pack 102 is simultaneously used to power devices connected through point C, which may be lower voltage VRs, and devices connected through point D, which may be higher voltage VRs. As illustrated, battery pack outputs a voltage 240, which may be sent through switch 236 when the switch is connected to terminal 238, such that external devices connected to point C are powered. As noted previously, these devices may include lower voltage VRs, such as VRs 112. Voltage 240 may also be received at terminal 224 of buck converter 202. In some embodiments, buck converter 202 may be operable to upconvert the voltage sent from battery pack 102 and output a higher voltage 244 at terminal 226. In some embodiments, the terminal 226 may be connected through a circuit to terminal 218 of switch 214, as illustrated. In the embodiment of FIG. 5, switch 214 is toggled to terminal 218, thereby providing a path for upconverted voltage 244 to reach external, higher voltage devices through point D. In some embodiments, the upconverted voltage 244 from buck converter 202 may be similar to the normal voltage 242 of battery pack 104. In other embodiments, the upconverted voltage 244 may be less than voltage 242.

Accordingly, battery system 100 may power all devices 112, 114 using battery pack 102 when the charge state in battery pack 104 is below a threshold for use of battery pack 104, and no charging power is available. When charging power subsequently becomes available, battery system 100, and in particular, battery charger 106 may monitor the charge state of battery pack 104 to determine when a threshold charge state for returning to "normal" battery powered operation has been met. The charge threshold for returning battery pack 104 to normal operation may be different than the charge threshold for switching from normal operation to use battery pack 102 to backup battery pack 104. Battery charger 106 may then prevent buck converter 202 from receiving and/or upconverting voltage from battery pack 102, and switch 214 may be connected to terminal 216. This may help prevent the inefficient use of battery pack 102 to power both higher and lower voltage VRs when the device platform connected to battery system 100 subsequently becomes disconnected from charging power.

In various embodiments, a battery system may include more than two battery packs, in which each battery pack may have a different output voltage for normal operation. In turn, each battery pack may be connected to a separate set of devices, such as voltage regulators, whose operating voltage range is tailored to the specific battery pack output voltage. In this manner, each battery pack output voltage may more closely match the voltage of devices to receive power from its given battery pack. In some embodiments, the battery systems for such multiple battery pack architecture may have battery chargers that are arranged to provide flexible operation. In some embodiments, one or more battery packs may be operable to provide voltage to multiple sets of devices when all of the battery packs are not available to supply power to their respective normally-powered devices.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a computer-readable medium or article which may store an instruction or a set of instructions that, if executed by a computer, may cause the computer to perform a method and/or operations in accordance with the embodiments. Such a computer may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
a first battery pack, the first battery pack having a first output voltage, the first battery pack arranged to output the first output voltage over a first connection;
a second battery pack, the second battery pack having a second output voltage higher than the first output voltage, the second battery pack arranged to output the second output voltage over a second connection; and
a battery charger arranged to receive power from a charging power source, the battery charger comprising:
a first switch arranged to toggle between a first position to connect the first battery pack to the first connection, a second position to connect the charging power source to the first connection, and a third position to isolate the first connection from the first battery pack and the charging power source;
a second switch arranged to toggle between a fourth position to connect the second battery pack to the second connection and a fifth position to connect the charging power source to the second connection;
a third switch arranged to toggle between a sixth position to connect the second battery pack to the first connection and a seventh position to isolate the second battery pack from the first connection, the first switch, the second switch, and the third switch independent of each other;
a first voltage converter arranged between the charging power source, the first battery pack, and the first position of the first switch; and
a second voltage converter arranged between the charging power source, the second battery pack, the fourth position of the second switch and the sixth position of the third switch, the first and the second voltage converters operable to reduce voltage from the charging power source to respective first and second downconverted voltages and operable to output the respective first and second downconverted voltages to respective first and second battery packs when the first switch is in the second position and the second switch is in the fifth position.

2. The apparatus of claim 1, the first connection to be connected to a first set of devices in a device platform that operate at respective voltages spanning a first voltage range, the second connection to be connected to a second set of devices that operate at respective voltages spanning a second voltage range higher than the first voltage range, and wherein the first voltage range comprises the first output voltage and the second voltage range comprises the second output voltage.

3. The apparatus of claim 2, the first set of devices to comprise a first set of voltage regulators and the second set of devices to comprise a second set of voltage regulators.

4. The apparatus of claim 1, the third switch operable to toggle to the sixth position when a charge state in the first battery pack is below a first threshold and charging power is not available.

5. The apparatus of claim 1, the first voltage converter operable to upconvert the first output voltage when the second switch is in the fifth position to operably couple the first voltage converter to the second connection.

6. The apparatus of claim 1, wherein the battery charger comprises a first and a second coulomb counter disposed between the battery charger and the respective first and second battery packs.

7. The apparatus of claim 5, wherein the battery charger comprises a system bus controller operable to output a charge status of the first and second battery packs.

8. The apparatus of claim 1, wherein the first voltage is about 2.8 to 4.2 V and the second voltage is about 5.6 to 8.4 V.

9. The apparatus of claim 2, wherein the first and second set of devices are voltage regulators operable to control voltage in respective components of the device platform.

10. The apparatus of claim 1, wherein the first battery pack comprises multiple batteries arranged in parallel, wherein the second battery pack comprises a first set of multiple batteries arranged in series and a second set of multiple batteries arranged in series, the first set of multiple batteries arranged in parallel with the second set of multiple batteries, and wherein the multiple batteries of the first battery pack and the multiple batteries of the second battery pack comprise different batteries.

11. The apparatus of claim 10, wherein the first battery pack comprises a 1S×P configuration and the second battery pack comprises a 2S×P configuration.

12. A method, comprising:
detecting that power from a charging power source is not available to supply voltage to a device platform;
setting a first switch to a first position to provide a first voltage from a first battery pack of a battery system to a first set of voltage regulators in the device platform that operate at respective voltages spanning a first voltage range comprising the first voltage, the first switch arranged to toggle between the first position to connect the first battery pack to a first connection, a second position to connect the charging power source to the first connection, and a third position to isolate the first connection from the first battery pack and the charging power source, the first connection electrically coupled to the first set of voltage regulators;
setting a second switch to a fourth position to provide a second voltage greater than the first voltage from a second battery pack of the battery system to a second set of voltage regulators in the device platform that operate at respective voltages spanning a second voltage range higher than the first voltage range comprising the second voltage, the second switch arranged to toggle between the fourth position to connect the second battery pack to the second connection and a fifth position to connect the charging power source to the second connection, the second connection electrically coupled to the second set of voltage regulators; and
setting a third switch to a sixth position, the third switch arranged to toggle between a sixth position isolate the second battery back from the first connection and a seventh position to connect the second battery pack to the first connection, the first switch, the second switch, and the third switch independent of each other,
a first voltage converter and a second voltage converter operable to reduce voltage from the charging power source to respective first and second downconverted voltages and operable to output the respective first and second downconverted voltages to respective first and second battery packs when the first switch is in the second position and the second switch is in the fifth position.

13. The method of claim 12, comprising:
setting the third switch to the seventh position to provide the second voltage from the second battery pack to the first set of voltage regulators when a first charge state in the first battery pack is below a first threshold.

14. A system, comprising:
a first set of voltage regulators arranged to regulate voltage in a first set of components that operate in a first voltage range;
a second set of voltage regulators arranged to regulate voltage in a second set of components that operate in a second voltage range that is higher than the first voltage range;
a charging power source operable to supply power to the first and second sets of voltage regulators; and
a battery system that comprises:
- a first battery pack and a second battery pack, the first battery pack arranged to supply a first voltage to a first connection electrically coupled to the first set of voltage regulators and the second battery pack operable to supply a second voltage higher than the first voltage to a second connection electrically coupled to the second set of voltage regulators when power from the charging power source is not available,
- a first switch arranged to toggle between a first position to connect the first battery pack to the first connection, a second position to connect the charging power source to the first connection, and a third position to isolate the first connection from the first battery pack and the charging power source;
- a second switch arranged to toggle between a fourth position to connect the second battery pack to the second connection and a fifth position to connect the charging power source to the second connection;
- a third switch arranged to toggle between a sixth position to connect the second battery pack to the first connection and a seventh position to isolate the second battery pack from the first connection, the first switch, the second switch, and the third switch independent of each other,
- a first voltage converter and a second voltage converter operable to reduce voltage from the charging power source to respective first and second downconverted voltages and operable to output the respective first and second downconverted voltages to respective first and second battery packs when the first switch is in the second position and the second switch is in the fifth position.

15. The system of claim 14, wherein the battery system is operable to supply voltage from the second battery pack to the first set of voltage regulators when a first charge state in the first battery pack is below a first threshold and operable to supply voltage from the first battery pack to the second set of voltage regulators when a second charge state in the second battery pack is below a second threshold.

* * * * *